United States Patent
Patiño Crespo et al.

(10) Patent No.: US 10,151,354 B2
(45) Date of Patent: Dec. 11, 2018

(54) UNIVERSAL DAMPER AND INTERCHANGEABLE HUB ASSEMBLY

(71) Applicant: Schaeffler Technologies AG & Co. KG, Herzogenaurach (DE)

(72) Inventors: Daniel Patiño Crespo, Puebla (MX); Raymundo Juan Lien Chang, Puebla (MX)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 225 days.

(21) Appl. No.: 15/260,454

(22) Filed: Sep. 9, 2016

(65) Prior Publication Data

US 2018/0073569 A1    Mar. 15, 2018

(51) Int. Cl.
| | |
|---|---|
| F16D 13/64 | (2006.01) |
| F16D 3/12 | (2006.01) |
| F16D 3/14 | (2006.01) |
| F16D 13/38 | (2006.01) |

(52) U.S. Cl.
CPC ............. F16D 13/644 (2013.01); F16D 3/12 (2013.01); F16D 13/38 (2013.01); *F16D 2250/00* (2013.01); *F16D 2300/22* (2013.01)

(58) Field of Classification Search
CPC .......... F16D 13/38; F16D 13/644; F16D 3/12; F16D 2300/22; F16D 2250/00
See application file for complete search history.

(56) References Cited

U.S. PATENT DOCUMENTS

| | | | | |
|---|---|---|---|---|
| 3,299,671 | A | * | 1/1967 | De Coye De Castelet ................ F16D 13/68 464/57 |
| 4,418,812 | A | * | 12/1983 | Lech, Jr. ............. F16F 15/1219 192/206 |
| 4,461,376 | A | * | 7/1984 | Lech, Jr. ................... F16D 3/12 192/206 |
| 4,537,580 | A | * | 8/1985 | Loizeau ................ F16D 13/686 192/205 |
| 4,651,859 | A | * | 3/1987 | Frantz ............... F16F 15/12353 192/204 |
| 4,800,996 | A | * | 1/1989 | Loizeau .................. F16D 13/68 192/103 B |
| 5,246,399 | A | * | 9/1993 | Yanko ................. F16F 15/1202 192/213.1 |

FOREIGN PATENT DOCUMENTS

GB            2235749 A * 3/1991 ............... F16D 3/80

* cited by examiner

*Primary Examiner* — Jacob S. Scott
*Assistant Examiner* — Tinh Dang
(74) *Attorney, Agent, or Firm* — Brooks Kushman P.C.

(57) ABSTRACT

A clutch disc assembly, comprising a friction plate, a damper fixedly secured to the friction plate, comprising an inwardly facing saline and a retainer plate, the retainer plate comprises a first radially inwardly facing surface and a second radially inwardly facing surface radially offset from the first radially inwardly facing surface, and a hub, the hub comprises a first radially outwardly facing surface having a circumferential groove, a second radially outwardly facing surface having an outer saline that meshes with the inwardly facing saline to non-rotatably connect the hub and the damper, and an internal saline surface.

8 Claims, 8 Drawing Sheets

UNIVERSAL DAMPER AND INTERCHANGEABLE HUB ASSEMBLY

FIELD

The present disclosure relates to clutch discs, in particular, to a clutch disc assembly having a universal damper, more particularly, to a clutch disc assembly having a universal damper that is compatible with interchangeable hubs, and, even more particularly, to a clutch disc assembly having a universal damper that allows installation of an interchangeable hub after assembly.

BACKGROUND

A clutch is a mechanical device that engages and disengages the power transmission, especially from the driving shaft to the driven shaft. Clutches are used whenever the transmission of power or motion must be controlled either in amount or over time (e.g., electric screwdrivers limit how much torque is transmitted through use of a clutch; clutches control whether automobiles transmit engine power to the wheels). Typically, a friction clutch consists of at least a flywheel, which is connected to the engine through the crankshaft, a clutch disc, which is connected to the gearbox (e.g., transmission) through the input shaft, and a pressure plate. To engage the clutch, the pressure plate presses the friction surface of the clutch disc tightly against the friction surface of the rotating flywheel. The contact between the friction surfaces causes the clutch disc to rotate and provide power to the gearbox. To disengage, the pressure from pressure plate is removed, which in turn releases the clutch disc from contact with the flywheel. The main components of a clutch disc are the friction plate, damper, a splinted hub, and cover plate.

Normal clutch disc assembly generally includes securing the damper to the friction plate, aligning the splinted hub with the damper, and securing the hub to the damper by riveting the cover plate to the damper. However, because the cover plate is secured to the damper with rivets, the splinted hub must be installed during the assembly of the clutch disc. Clutch disc unification is not possible because there are many saline profile variations. This creates manufacturing, supply, and logistics problems because all of the components of the clutch disc must be assembled at once, before knowing the required saline profile of the end user.

It therefore is an object of the disclosure to provide a clutch disc having a universal damper and an interchangeable hub, which can be installed after assembly is complete. Interchangeable hubs can be manufactured with a variety of different saline profiles while maintaining their compatibility with the universal damper design.

SUMMARY

According to aspects illustrated herein, there is provided a clutch disc assembly, comprising a friction plate, a damper fixedly secured to the friction plate, comprising an inwardly facing saline and a retainer plate, the retainer plate comprises a first radially inwardly facing surface and a second radially inwardly facing surface radially offset from the first radially inwardly facing surface, and a hub, the hub comprises a first radially outwardly facing surface having a circumferential groove, a second radially outwardly facing surface having an outer saline that meshes with the inwardly facing saline to non-rotatably connect the hub and the damper, and an internal saline surface.

According to aspects illustrated herein, there is provided a clutch disc assembly, comprising a friction plate having a through-bore, a retainer plate comprising a first radially inwardly facing surface having an inwardly facing saline and a second radially inwardly facing surface radially offset from the first radially inwardly facing surface, and a hub, the hub comprises a first radially outwardly facing surface having a circumferential groove, a second radially outwardly facing surface having an outer saline that meshes with the inwardly facing saline to non-rotatably connect the hub and the damper, and an internal saline surface.

According to aspects illustrated herein, there is provided a method of assembling a clutch disc assembly, the method comprising non-rotatably securing a retainer plate to a damper, the damper has an internal saline and the retainer plate comprises a first radially inwardly facing surface and a second radially inwardly facing surface radially offset from the second radially inwardly facing surface, the retainer plate is arranged such that the first radially inwardly facing surface is directed toward a front side of the damper, non-rotatably securing the damper to a friction plate, the damper comprises an opening located on the front side of the damper such that the first radially inwardly facing surface of the retainer plate is exposed; inserting, in a first axial direction, a front end of a hub through the opening in the damper, the front end of the hub comprises a circumferential groove, aligning, in a circumferential direction, a rear end of the hub with the internal saline of the damper, the rear end of the hub comprises an outer saline that meshes with the internal saline of the damper; inserting, in the first axial direction, the rear end of the hub into the damper such that the outer saline engages with the internal saline and abuts against the retainer plate, and affixing a retainer ring to the circumferential groove of the front end of the hub.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of" "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
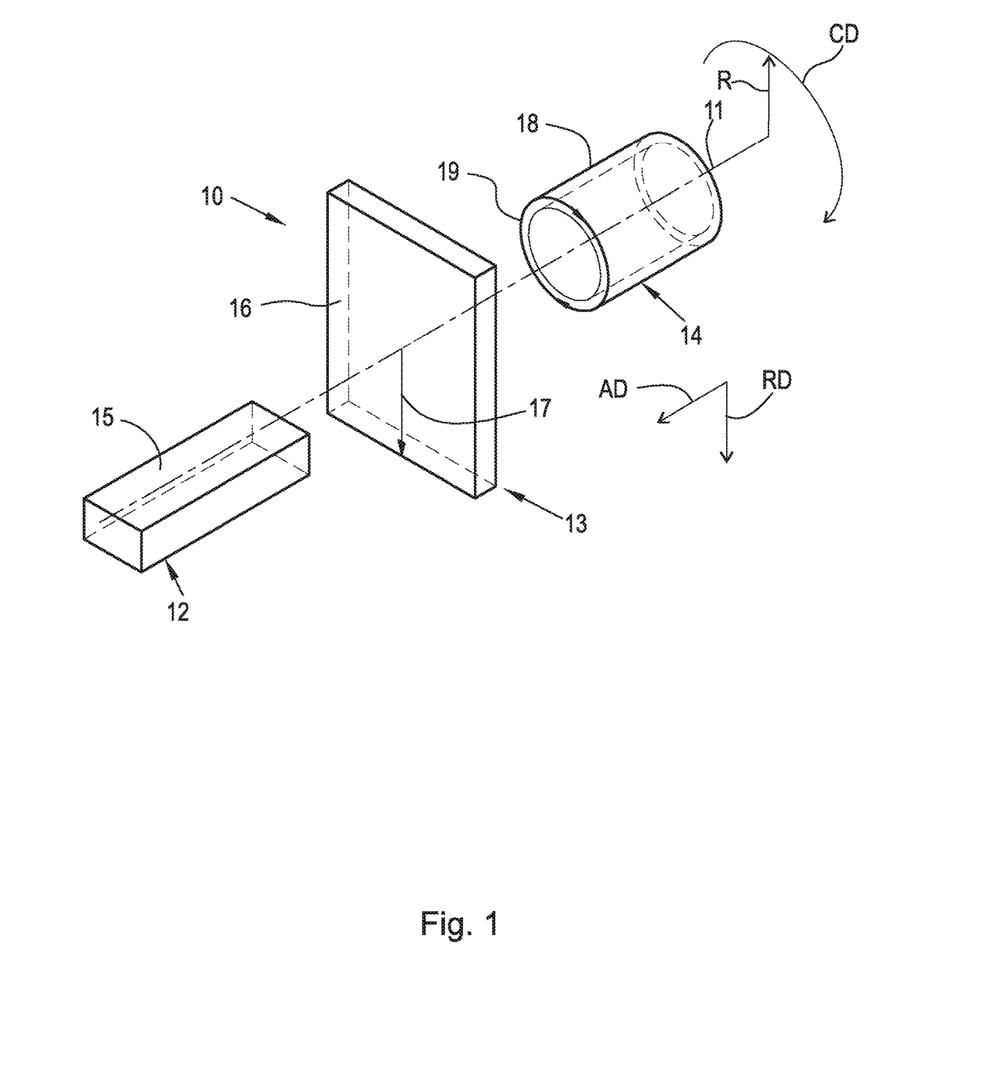
FIG. 1 is a perspective view of a cylindrical coordinate system demonstrating spatial terminology used in the present application.

Adverting now to the figures, FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD. Is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 22, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
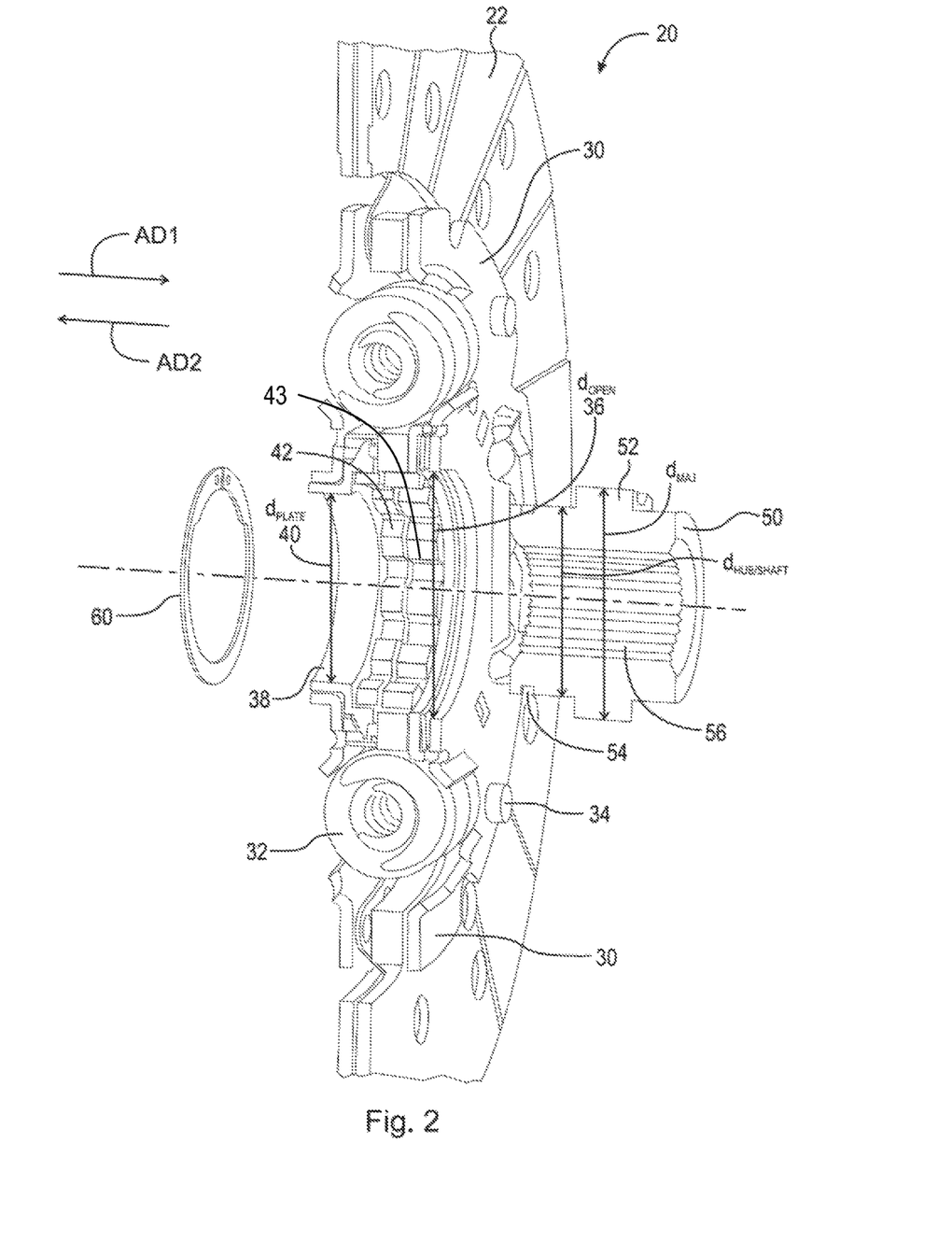
FIG. 2 is an exploded cross-sectional perspective view of a clutch disc having a universal damper and an interchangeable hub.

FIG. 2 is an exploded cross-sectional perspective view of clutch disc 20 comprising friction plate 22, universal damper 30, interchangeable hub 50, and retainer ring 60. For the purposes of this description, clutch disc 20 comprises a front face, which faces direction AD1, and a rear face, which faces direction AD2. It should be appreciated, however, that the orientation of the clutch disc assembly described herein can be reversed. In an example embodiment, clutch disc 20 comprises a front face, which faces direction AD2, and a rear face, which faces direction AD1.

Clutch disc 20 comprises friction plate 22. Friction plate 22 is a double dry clutch friction disc; however, it should be appreciated that any other suitable type of clutch disc (e.g., single dry clutch friction disc) can be used. Friction disc 22 comprises friction material on at least one face (i.e., the face that engages the flywheel) or on both faces. Friction plate 22 can comprise any material suitable for connecting clutch disc 20 to a flywheel to transmit power to an input shaft (e.g., input shaft for a transmission). For example, friction plate 22 can be organic material riveted to wavy metal cushion segments (i.e., marcels), which soften clutch engagement, or rigidly mounted cerametallic friction material.

Universal damper 30 comprises damping springs 32, opening 36, and retainer plate 38. Universal damper 30 is non-rotatably secured to friction plate 22 with one or more rivets 34. It should be appreciated, however, that any other suitable means of non-rotatably securing universal damper 30 to friction plate 22 can be used. Retainer plate 38 is non-rotatably secured to universal damper 30, and comprises circular retainer plate aperture 40, having diameter $d_{PLATE}$, and internal splines 42, having a minor diameter that is greater than or equal to diameter $d_{PLATE}$. Additional internal splines 43 are also provided on the retainer plate 38. Retainer plate 38 further comprises abutment 72 located between retainer plate aperture 40 and internal splines 42 (see FIG. 4). Abutment 72 is a change in the contour of retainer plate 38 that limits the movement of interchangeable hub 50 in one axial direction. Retainer plate 38 is secured to universal damper 30 such that internal splines 42 are directed toward the front face of clutch disc 20 and are exposed in opening 36 (see FIG. 5B). Any suitable means for non-rotatably securing retainer plate 38 to universal damper 30 can be used. In an example embodiment, retainer plate 38 and universal damper 30 are designed as a single formed part. Opening 36 is positioned on the front face of clutch disc 20 and has diameter $d_{OPEN}$. Opening diameter $d_{OPEN}$ is greater than retainer plate diameter $d_{PLATE}$. Universal damper 30 is designed such that interchangeable hub 50 can be inserted through opening 36 and abut against retainer plate 38 at abutment 72. For example, opening 36 is a through-bore in universal damper 30; retainer plate 38 is operatively arranged along the rear face of clutch disc 20 and effectively reduces the through-bore diameter. In another example, opening 36 is a counter-bore with a through-bore in universal damper 30. Damping springs 32 are one or more small springs located between opening 36 (or interchangeable hub 50) and friction plate 22 to soften the response of the clutch engagement (i.e., clutch disc 20 is pressed tightly against the flywheel) and disengagement (i.e., pressure is removed releasing clutch disc 20 from contact with the flywheel). It should be appreciated, however, that any other suitable means to absorb vibration and shock produced by clutch engagement, such as positioning friction washers inside clutch disc 20, can be used.

Interchangeable hub 50 is a round tube comprising outer splines 52, retainer ring flange 54, and internal splines 56. Splines are evenly spaced ridges that line the inside and outside wall surface of interchangeable hub 50 to non-rotatably lock friction plate 22, universal damper 30, and interchangeable hub 50 with the input shaft. Internal splines 56 on interchangeable hub 50 should be chosen such that they mesh with the splines on the input shaft. Interchangeable hub 50 has outer diameter $d_{HUB}$. Interchangeable hub outer diameter $d_{HUB}$ is less than retainer plate aperture diameter $d_{PLATE}$. Outer splines 52 have major saline diameter $d_{MAJ}$ that is greater than retainer plate aperture diameter $d_{PLATE}$, which causes retainer plate 38 to interfere with interchangeable hub 50 and prevent further axial movement in direction AD2 (see abutment 72 in FIG. 4). Major saline diameter $d_{MAJ}$ is less than opening diameter $d_{OPEN}$, which allows interchangeable hub 50 to be installed in, or removed from, universal damper 30 even after the assembly process is completed (i.e., the damper is riveted to the friction plate). Outer splines 52 comprise a plurality of ridges or teeth that mesh with internal splines 42 such that, once secured to universal damper 30, interchangeable hub 50, universal damper 30, and friction plate 22 are non-rotatably locked (see FIG. 5). Internal splines 42 and outer splines 52 have involute saline geometry; however, it should be appreciated that any other suitable saline geometry, such as straight-tooth, can be used. Retainer ring flange 54 is a circumferential groove bored into interchangeable hub 50, having a width dimension that is at least equal to the thickness dimension of retainer ring 60. Thus, retainer ring flange shaft (outer) diameter $d_{SHAFT}$ is equal to interchangeable hub outer diameter $d_{HUB}$, and groove size diameter $d_{GROOVE}$ that is less than interchangeable hub outer diameter $d_{HUB}$ (described further with respect to FIG. 4 below).

Retainer ring 60 is a fastener that axially locks interchangeable hub 50 into universal damper 30. Retainer ring 60 has outer diameter $d_{RING}$, which is greater than retainer plate diameter $d_{PLATE}$, and is capable of maintaining its structural dimensions and material properties after being installed in the circumferential groove of retainer ring flange 54. Retainer ring 60 is affixed to interchangeable hub 50 at the exposed retainer ring flange 54 (see FIG. 4) and acts as a shoulder, which secures interchangeable hub 50 in universal damper 30. There is no need for a clutch cover plate because, once affixed to the circumferential groove of retainer ring flange 54, retainer ring 60 prevents interchangeable hub 50 from axial movement in direction AD1. Retainer ring 60 is an external retaining ring of suitable material strength to withstand an axial force of at least 20,000 N. In an example embodiment, retainer ring 60 comprises a Rotor Clip® Part Number SHI-162. It should be appreciated, however, that any other suitable means for securing interchangeable hub 50 to universal damper 30 can be used.

Figure 3:
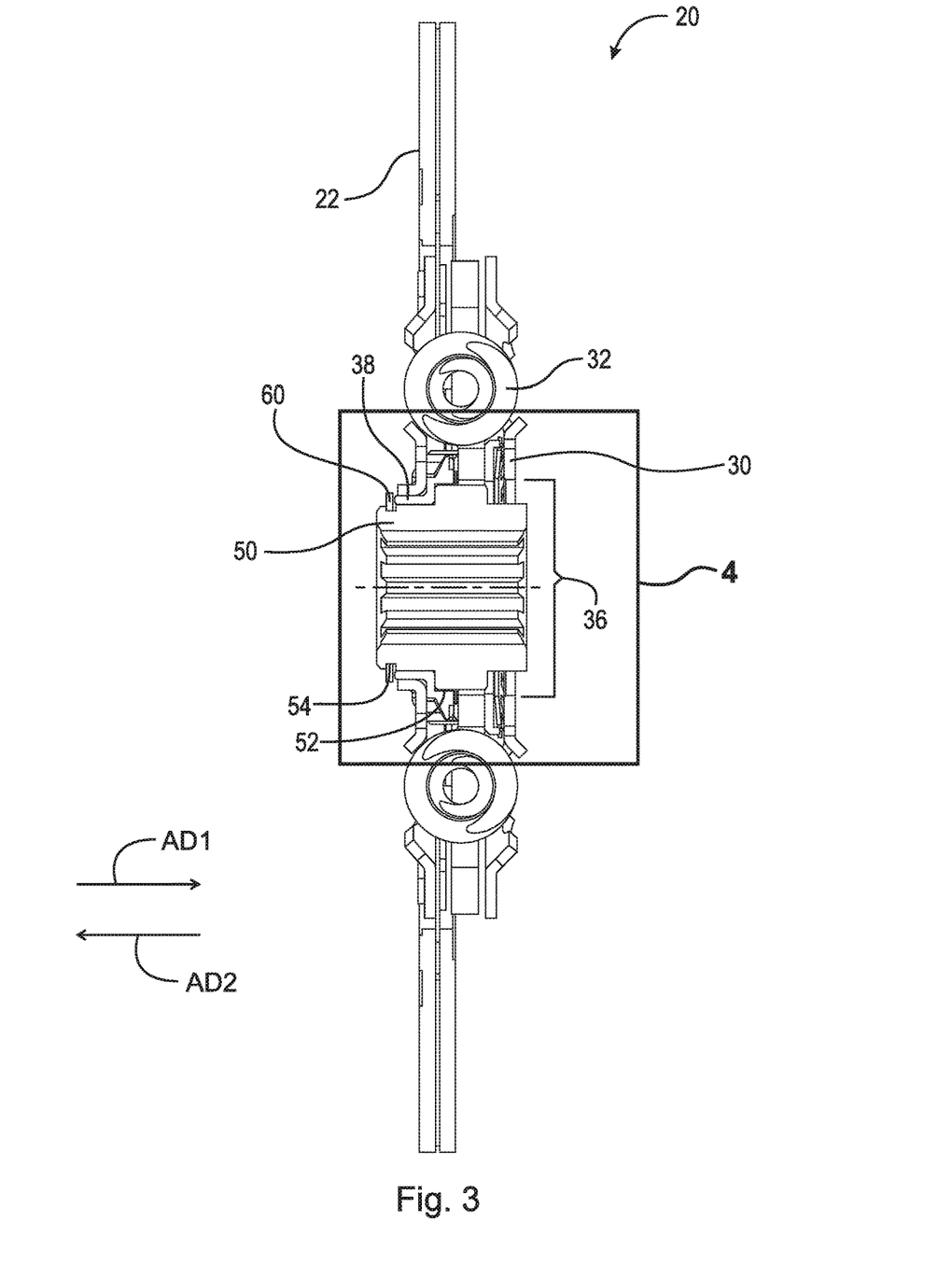
FIG. 3 is a cross-sectional left side view of a clutch disc having a universal damper secured in an interchangeable hub.

FIG. 3 is a cross-sectional left view of clutch disc 20 with interchangeable hub 50 secured to universal damper 30. Universal damper 30 comprises opening 36, which is exposed on the front face of clutch disc 20, and retainer plate 38, which is located near the rear face of clutch disc 20. Interchangeable hub 50 is inserted, retainer ring flange 54 first, through opening 36 in direction AD2. When fully inserted, interchangeable hub outer splines 52 mesh with retainer plate internal splines 42 and retainer plate 38 prevents interchangeable hub 50 from further axial movement in direction AD2. Specifically, the interference occurs once outer splines 52 come into contact with retainer plate aperture 40 (abutment 72 in FIG. 4) because outer splines major diameter $d_{MAJ}$ is greater than retainer plate diameter $d_{PLATE}$. Retainer ring flange 54 extends past retainer plate 38 exposing the circumferential groove. Retainer ring 60 is affixed to retainer ring flange 54 and prevents interchangeable hub 50 from movement in axial direction AD1. As such, retainer plate 38 and retainer ring 60 secure interchangeable hub 50 in universal damper 30 by preventing axial movement in directions AD2 and AD1, respectively. Because the clutch disc assembly disclosed herein does not require a clutch cover plate, which is typically riveted to the damper to secure the hub, a hub can be chosen and installed after the clutch disc is manufactured.

Figure 4:
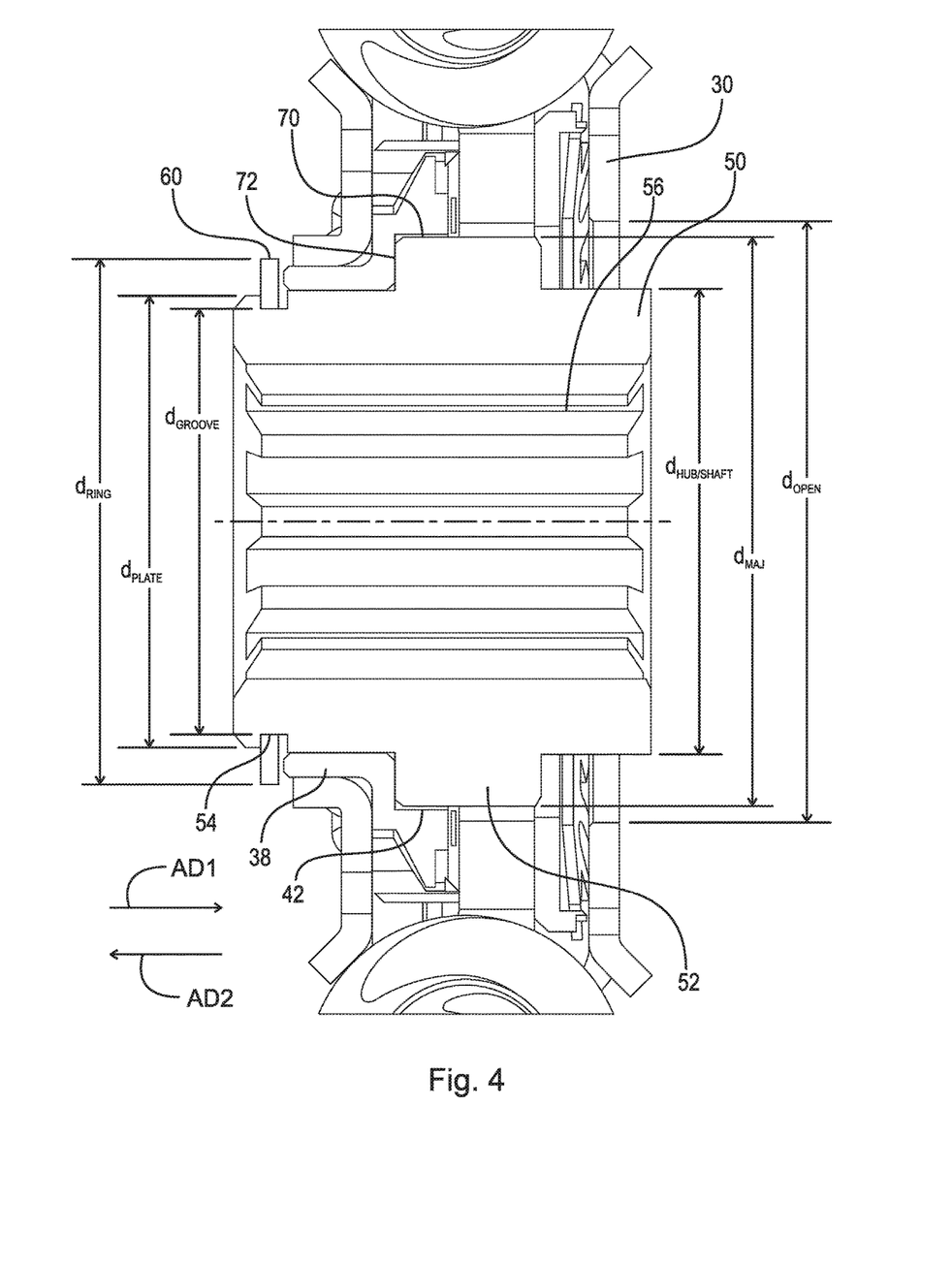
FIG. 4 is an enlarged cross-sectional left side view of the clutch disc of FIG. 3.
Figure 5A:
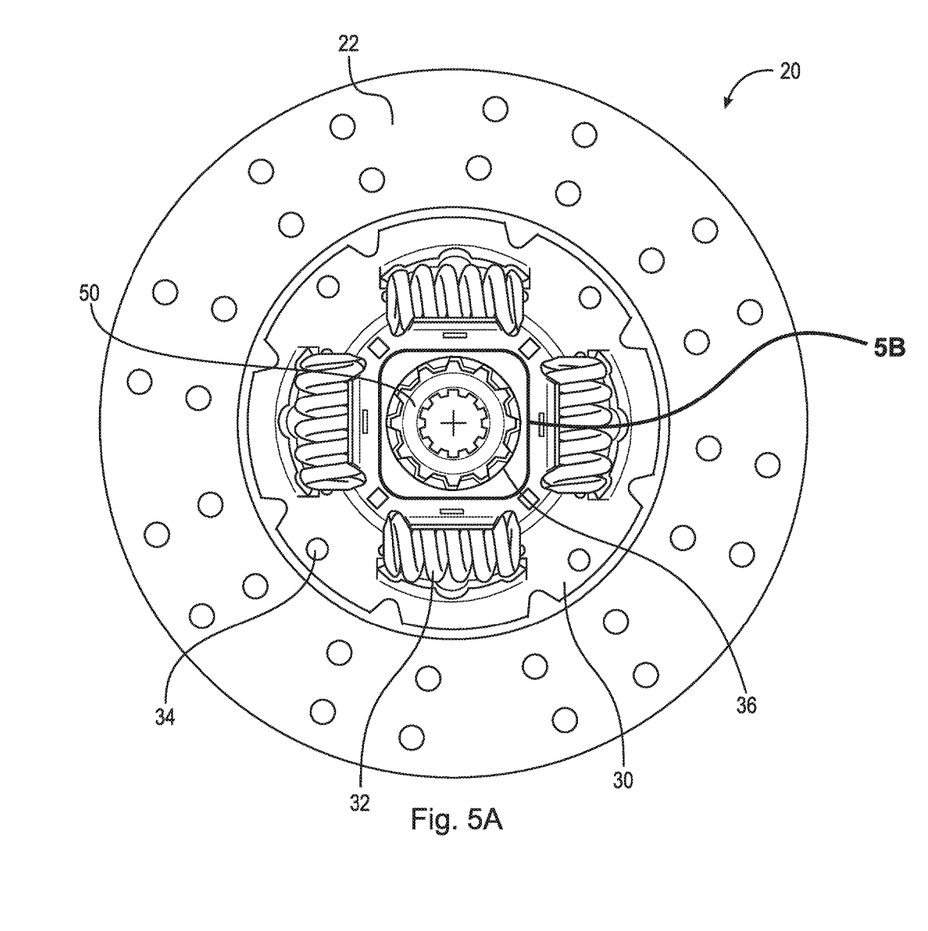
FIG. 5A is a front view of a clutch disc having an interchangeable hub inserted in a universal damper.

FIG. 4 is an enlarged view of clutch disc 20 shown in FIG. 3, with interchangeable hub 50 secured in universal damper 30. Opening diameter $d_{OPEN}$ is greater than outer splines major diameter $d_{MAJ}$ allowing interchangeable hub 50 to be easily inserted in, and removed from, universal damper 30. Outer splines 52 align with internal splines 42 and abut against retainer plate 38 at abutment 72. Interchangeable hub outer splines 52 mesh with retainer plate internal splines 42. It should be appreciated that any saline parameter dimensions suitable for the particular application (e.g. vehicles, bicycles, power drills, etc.) can be used for outer splines 52 and internal splines 42. Similarly, saline engagement length 70 (the length in which meshing splines overlap) can be adjusted based on the particular application. Contact occurs between outer splines 52 and retainer plate 38 at abutment 72 because aperture diameter $d_{PLATE}$ is less than outer splines major diameter $d_{MAJ}$, thus preventing interchangeable hub 50 from further axial movement in direction AD2. Retainer ring 60 is affixed to retainer ring flange 54, which extends past retainer plate 38 when interchangeable hub 50 is fully inserted into universal damper 30. The exposed circumferential groove of retainer ring flange 54 comprises shaft (outer) diameter $d_{SHAFT}$ (equal to interchangeable hub outer diameter $d_{HUB}$) and groove diameter $d_{GROOVE}$. Retainer ring outer diameter $d_{RING}$ is greater than aperture diameter $d_{PLATE}$ and prevents interchangeable hub 50 from axial movement in direction AD1.

Figure 5B:
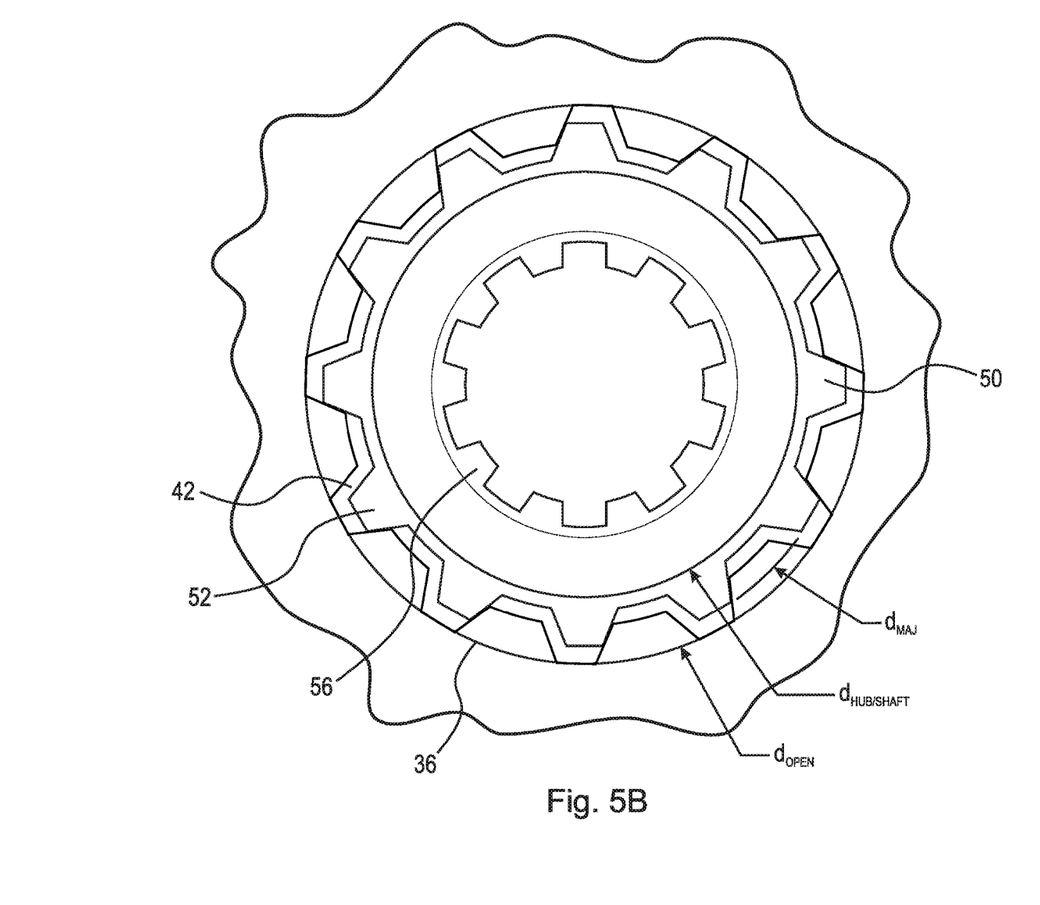
FIG. 5B is an enlarged front view of the clutch disc shown in FIG. 5A.

FIG. 5A is a front view of clutch disc 20 with interchangeable hub 50 secured in universal damper 30. FIG. 5B is an enlarged front view of clutch disc 20 shown in FIG. 5A. Interchangeable hub outer splines 52 align with retainer plate internal splines 42 and interchangeable hub 50 is inserted into universal damper 30 through opening 36 until outer splines 52 abut retainer plate 38 (abutment 72 in FIG. 4). It should be appreciated that interchangeable hub 50 and universal damper 30 are designed such that outer splines 52 properly mesh with internal splines 42. Interchangeable hub 50 can be inserted into universal damper 30 even after clutch disc 20 is assembled (i.e., after the damper has been riveted to the friction plate) because outer splines major diameter $d_{MAJ}$ is less than opening diameter $d_{OPEN}$. Thus, a hub having the proper saline profile (i.e., internal splines 56) can be chosen and installed in the assembled clutch disc based on the specific consumer needs.

Figure 6A:
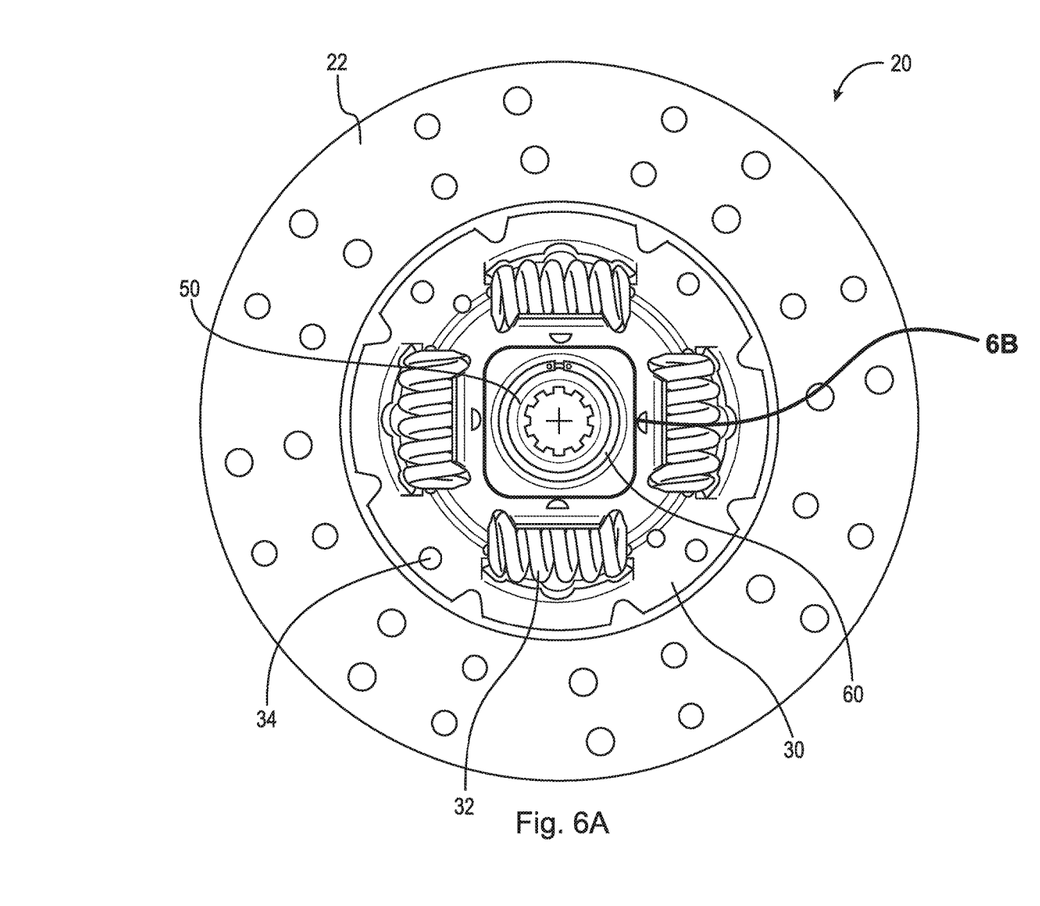
FIG. 6A is a rear view of a clutch disc having an interchangeable hub secured in a universal damper; and, FIG. 6B is an enlarged rear view of the clutch disc shown in FIG. 6A.
Figure 6B:
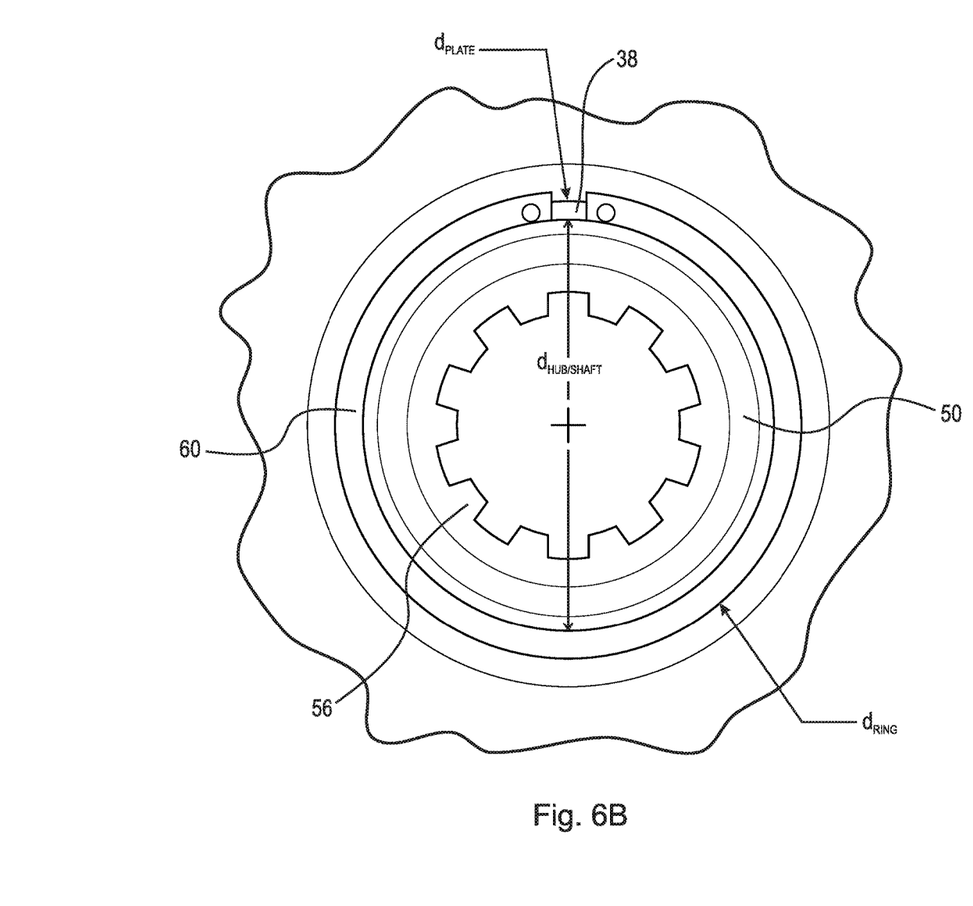

FIG. 6A is a rear view of clutch disc 20 with interchangeable hub 50 secured in universal damper 30. FIG. 6B is an enlarged rear view of clutch disc 20 shown in FIG. 6A. Retainer ring 60 is affixed to retainer ring flange 54 and secures interchangeable hub 50 to universal damper 30. Retainer ring outer diameter $d_{RING}$ is greater than retainer plate aperture diameter $d_{PLATE}$ and prevents interchangeable hub 50 from axial movement in direction AD1 (see FIG. 4). In the event that interchangeable hub 50 must be replaced (e.g., internal splines 56 have worn down), retainer ring 60 is removed from retainer ring flange 54 and interchangeable hub 50 can be removed from universal damper 30 in axial direction AD1.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Cylindrical Coordinate System
11 Longitudinal Axis
12 Object
13 Object
14 Object
15 Axial Surface
16 Radial Surface
17 Radius
18 Surface
19 Circumference
20 Clutch Disc
22 Friction plate
30 Universal Damper
32 Damping Springs
34 Rivets
36 Opening
38 Retainer Plate
40 Retainer Plate Aperture
42 Retainer Plate Internal Splines
43 Additional internal splines
50 Interchangeable Hub
52 Interchangeable Hub Outer Splines
54 Retainer Ring Flange
56 Interchangeable Hub Internal Splines
60 Retainer Ring
70 Engagement Length
72 Abutment
$d_{PLATE}$ Retainer Plate Aperture Diameter
$d_{OPEN}$ Universal Damper Opening Diameter
$d_{HUB}$ Interchangeable Hub Outer Diameter
$d_{MAJ}$ Interchangeable Hub Major (Outer) Saline Diameter
$d_{SHAFT}$ Retainer Ring Flange Shaft (Outer) Diameter
$d_{GROOVE}$ Retainer Ring Flange Groove (Inner) Diameter
$d_{RING}$ Retainer Ring Outer diameter
AD1 Axial Direction 1
AD2 Axial Direction 2

What is claimed is:

1. A clutch disc assembly, comprising:
a friction plate;
a damper fixedly secured to the friction plate, comprising:
a retainer plate, comprising:
a first radially inwardly facing surface having an inwardly facing spline; and,
a second radially inwardly facing surface radially offset from the first radially inwardly facing surface; and,
a hub operatively arranged to be inserted in the damper in a first axial direction and removed from the damper in a second axial direction, the hub comprising:
a first radially outwardly facing surface having a circumferential groove;
a second radially outwardly facing surface having an outer spline that meshes with the inwardly facing spline to non-rotatably connect the hub and the damper; and,
an internal spline surface;
a retainer ring operatively arranged to secure within the circumferential groove;
wherein the friction plate, the damper, and the retainer plate are arranged concentrically about an axis of rotation.

2. The clutch disc assembly as recited in claim 1, wherein the hub, the damper, the retainer plate, and the friction plate are arranged concentrically about the axis of rotation.

3. The clutch disc assembly as recited in claim 1, wherein the second radially inwardly facing surface is operatively arranged to interfere with the outer spline such that, when the outer spline is engaged with the inwardly facing spline, the retainer plate prevents the hub from further movement in the first axial direction.

4. The clutch disc assembly as recited in claim 1, wherein the first radially outwardly facing surface is operatively arranged to be inserted through the second radially inwardly facing surface in the first axial direction such that, when the outer spline is engaged with the inwardly facing spline, the first radially outwardly facing surface extends beyond the second radially inwardly facing surface such that the circumferential groove is exposed.

5. The clutch disc assembly as recited in claim 4, wherein the retainer ring is operatively arranged to interfere with the second radially inwardly facing surface such that, when secured in the circumferential groove, the retainer ring prevents the hub from movement in the second axial direction.

6. The clutch disc assembly as recited in claim 1, wherein the damper comprises one or more damping springs.

7. The clutch disc of claim 1, further comprising an additional internal spline on the hub.

8. A clutch disc assembly, comprising: a friction plate having a through-bore;
a retainer plate comprising:
a first radially inwardly facing surface having an inwardly facing spline; and,
a second radially inwardly facing surface radially offset from the first radially inwardly facing surface; and,
a hub operatively arranged to be inserted in the friction plate in a first axial direction and removed from the friction plate in a second axial direction, the hub comprising:
a first radially outwardly facing surface having a circumferential groove;
a second radially outwardly facing surface having an outer spline that meshes with the inwardly facing spline to non-rotatably connect the hub and a damper;
an internal spline surface; and
a retainer ring operatively arranged to secure within the circumferential groove wherein the friction plate, the retainer plate, and the hub are arranged concentrically about an axis of rotation;
wherein the second radially inwardly facing surface is operatively arranged to interfere with the outer spline such that, when the outer spline is engaged with the inwardly facing spline, the retainer plate prevents the hub from further movement in the first axial direction.

* * * * *